United States Patent [19]

Rowen et al.

[11] Patent Number: 5,555,719
[45] Date of Patent: Sep. 17, 1996

[54] METHOD OF OPERATING A COMBINED CYCLE STEAM AND GAS TURBINE POWER GENERATING SYSTEM WITH CONSTANT SETTABLE DROOP

[75] Inventors: William I. Rowen; Jens Kure-Jensen, both of Schenectady, N.Y.

[73] Assignee: General Electric Co., Schenectady, N.Y.

[21] Appl. No.: 196,916

[22] Filed: Feb. 15, 1994

[51] Int. Cl.$^6$ .................................................. F02C 9/28
[52] U.S. Cl. ................................... 60/39.03; 60/39.182
[58] Field of Search ........................... 60/39.03, 39.181, 60/39.182

[56] References Cited

U.S. PATENT DOCUMENTS

| | | | |
|---|---|---|---|
| 3,505,811 | 4/1970 | Underwood | 60/39.182 |
| 4,333,310 | 6/1982 | Uram | 60/39.182 |
| 4,831,817 | 5/1989 | Linhardt | 60/39.182 |
| 5,042,247 | 8/1991 | Moore | 60/39.03 |
| 5,301,499 | 4/1994 | Kure-Jensen et al. | 60/39.03 |

FOREIGN PATENT DOCUMENTS 5783616  5/1982  Japan ................................. 60/39.182

OTHER PUBLICATIONS

"Operating Characteristics of Heavy–Duty Gas Turbines in Utility Service", William I. Rowen; ASME 88–GT–150; Presented at Gas Turbine and Aeroengine Congress, Amsterdam, The Netherlands, Jun. 6–9, 1988.

Primary Examiner—Richard A. Bertsch
Assistant Examiner—William Wicker
Attorney, Agent, or Firm—Nixon & Vanderhye

[57] ABSTRACT

A method of operating a combined-cycle gas and steam turbine power generating system on a single shaft 16 uses as a feedback to the speed control or governor a signal 22 representing the total power output of the generator less the total output of the steam turbine 12, which is then correlated with the error signal between the actual and reference speeds to alter the fuel flow to the gas turbine. By compensating the measured generator output by subtracting a value 24 representative of the steam turbine output so that the compensated signal 26 represents the contribution of only the gas turbine 10 to the generator output, a constant settable droop speed control system may be used in a single-shaft combined-cycle steam turbine and the gas turbine system to compensate for variable heating fuel value and/or changing combustion efficiency in dry low $NO_x$ combustion systems.

9 Claims, 1 Drawing Sheet

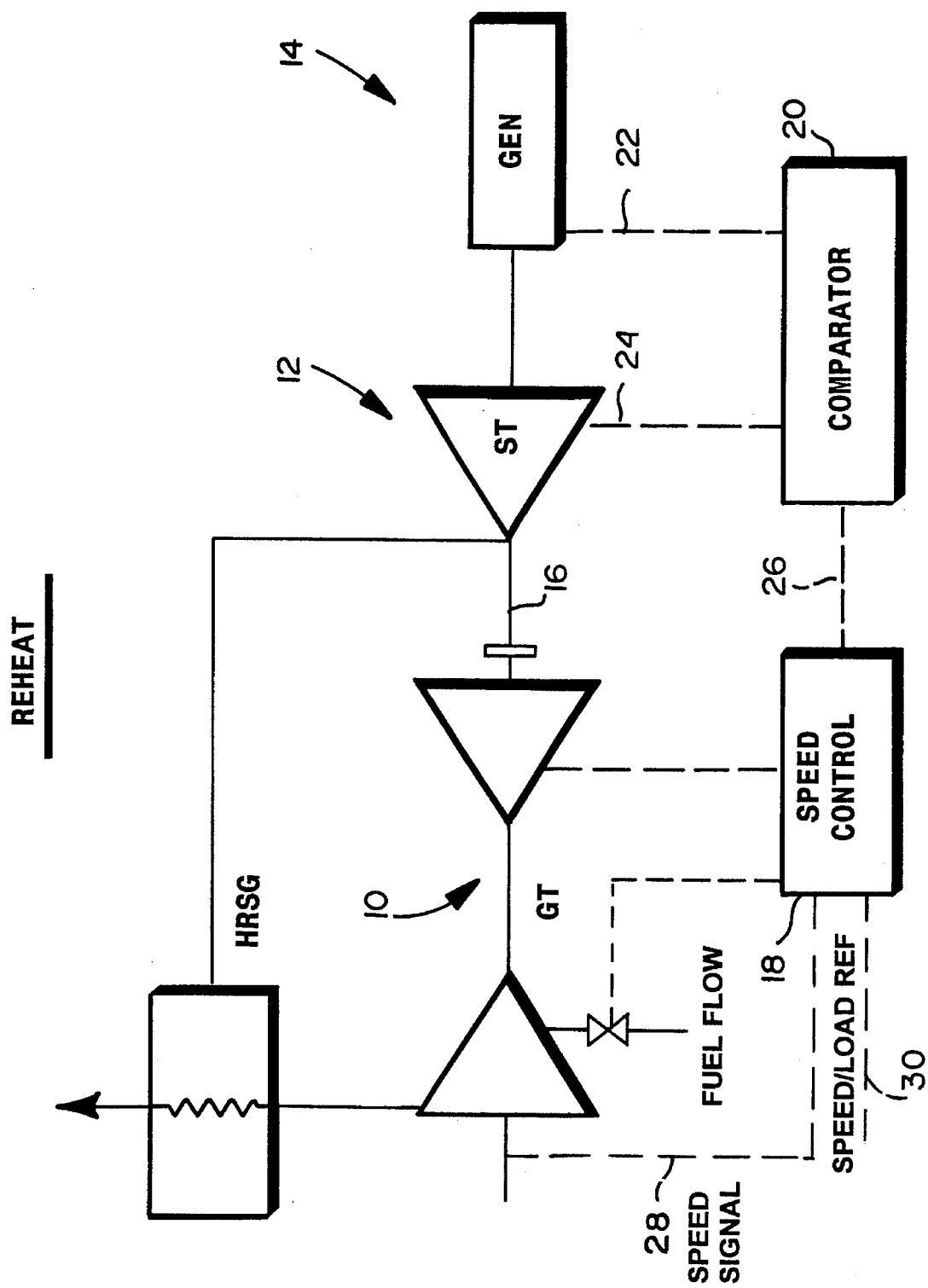

METHOD OF OPERATING A COMBINED CYCLE STEAM AND GAS TURBINE POWER GENERATING SYSTEM WITH CONSTANT SETTABLE DROOP

TECHNICAL FIELD

The present invention relates to combined cycle steam and gas turbine power generating systems and particularly to a method of operating such combined-cycle system, wherein the steam and gas turbines and generator are on a single shaft using a gas turbine control system employing megawatt feedback to implement a constant settable droop.

BACKGROUND

In typical gas turbine power generating systems, a governor or speed control is normally used to alter the fuel flow to the gas turbine to maintain turbine speed at preselected value under varying ambient and load conditions. By comparing actual turbine speed to a reference or setpoint value, sometimes called a speed changer under control of an operator, a speed error comprising the difference between the actual and reference values is determined. The change in fuel flow to the gas turbine is a function of this error. The output of the gas turbine can therefore be controlled by the operator by changing the speed error, i.e., by raising and/or lowering the reference value or setpoint.

This type of speed control is referred to as droop control or a droop governor, and the fuel flow to the gas turbine is a function of the error signal. For example, if a zero error signal exists, very little fuel is supplied the turbine inasmuch as it requires a certain minimum amount of fuel at no-load to operate the turbine. Thus, a zero error signal corresponds substantially to operation at no-load fuel. To obtain positive output, additional fuel must be supplied through an error signal between actual and reference speeds. If a positive error is set into the system by adjusting the setpoint, additional fuel is supplied the turbine in proportion to a gain constant. For example, to go from full speed no-load fuel to full speed full-load fuel, an error of 5% may be set into the governor, assuming a 20:1 gain constant, to obtain 100% fuel or full speed full-load fuel. The speed error between no-load to full-load is called droop. In the example, the error between the reference speed and the actual speed must be equal to the droop, i.e., 5%, to obtain 100% fuel, and 0% to obtain full speed no-load fuel in the turbine.

In systems of this type, the controlled fuel flow output to the turbine is measured as part of the feedback to the speed control. The energy content of the fuel, however, varies for example, in accordance with the vagaries of fuel temperature, heating value and frequently steam or water injection flow rates for low $NO_x$ operations. More specifically, fuel heating value variations are commonly encountered where fuel gas is produced as a petrochemical process by-product with variations in gas composition, where fuel gas is supplied from several different sources, or where fuel is supplied from a single field whose composition changes with age or acquisition depth. Fuel conversion efficiency to power output also changes as a result of turbine aging or, in a more pronounced fashion, as a result of changing combustion efficiency during mode changes employing a dry low $NO_x$ combustion system. As a consequence, measuring the fuel flow rate and providing a feedback signal to the speed governor responsive to the fuel flow rate does not accurately reflect the needed fuel to obtain the particular setting. However, because a gas turbine makes an excellent calorimeter, the generator output will reflect any change in the energy input at steady fuel flow command. Utilization of output power feedback in place of fuel flow feedback is called constant settable droop. Thus, a settable fractional feedback of generator output power is employed in place of the traditional fuel flow feedback using a constant settable droop control system. If a signal proportional to a percentage of the generator output is fed back to the governor in place of the fuel flow feedback, the result is a corresponding percent proportional droop system that will maintain this proportionality independently of fuel or fuel injection conditions. Constant settable droop is therefore a feature in which measured power output of the generator is substituted for fuel command feedback to cause a proportional or droop response of the speed governor to an error between speed setpoint and actual speed. It is employed where there is a deviation in the proportionality between gas turbine fuel command (fuel volume) and output power of the generator. Constant settable droop governing systems have been used for many years to compensate for these conditions on simple cycle gas turbines.

In modern-day energy production, combined-cycle systems are often employed. A typical combined-cycle system employs one or more gas turbines in conjunction with a steam turbine for driving a generator. One such typical combined-cycle system employs a steam turbine, a gas turbine and a generator on a single shaft. A constant settable droop control system for the gas turbine, however, cannot be employed directly in that the generator is driven by both the gas turbine and steam turbine which have widely varying dynamic responses to energy release within the gas turbine. Consequently, the generator output does not directly represent the gas turbine output as in simple-cycle gas turbine systems. This is especially true during simultaneous dynamic processes of loading and unloading the gas turbine through dry low $NO_x$ mode changing points. The slower response of the steam cycles alters the relationship. As a consequence, constant settable droop governing systems, as traditionally used in simple-cycle gas turbines have not heretofore been directly applicable to combined-cycle power generating systems.

DISCLOSURE OF THE INVENTION

According to the present invention, a constant settable droop governing system for controlling fuel flow to the gas turbine is employed in a combined-cycle steam and gas turbine power generation system by determining the proportion of the generator output contributed by the steam turbine and providing a compensated signal to the speed governor representing the contribution of only the gas turbine to the generator output. More particularly, if the total power output of the generator is measured and a value proportional to the steam turbine contribution to that total power is subtracted from the total power, the resulting value is a measurement of the instantaneous power of the gas turbine. That resulting value may then be used in a constant settable droop system as a feedback signal to enable closure of the governor loop to the gas turbine. In short, the present invention enables utilization of constant settable droop with a single shaft combined-cycle steam and gas turbine power generating system to compensate for the variable heating value fuel and/or changing combustion efficiency in dry low $NO_x$ combustion systems.

In accordance with the present invention, a representative value of the steam turbine contribution can be obtained by measuring the reheater pressure in reheat steam turbines or the turbine bowl pressure, downstream of the control valve, but upstream of the first-stage turbine nozzle for non-reheat steam turbines. By measuring this pressure signal, an indication of steam turbine power output for comparison with the total generator output is obtained. By subtracting that signal from the total generator output, a signal or value representative of only the gas turbine contribution to total generator output is provided. In the present invention, that latter signal is used in a constant settable droop governing system as the feedback signal to the speed changer. The present invention thus allows utilization of a constant settable droop control system for a gas turbine where the gas turbine mechanical power cannot otherwise be inferred directly from the generator output.

In a preferred embodiment according to the present invention, there is provided a method of operating a combined-cycle power generating system having a gas turbine, a steam turbine, and a generator, on a single shaft, comprising the steps of obtaining a first value representative of the total power output of the generator, obtaining a second value representative of the power output of the steam turbine, correlating the first and second values to obtain a third value representative of the power contribution solely of the gas turbine to the total power output of the generator, providing a speed governor for controlling fuel flow to the gas turbine as a function of an error signal between actual and reference speeds of the gas turbine and causing a proportional response of the speed governor to the error signal between the actual and reference speeds of the gas turbine and the third value for controlling the flow of fuel to the gas turbine.

Accordingly, it is a primary object of the present invention to provide a novel and improved method of operating a combined-cycle gas and steam turbine power generating system employing a constant settle droop governing system for the gas turbine.

BRIEF DESCRIPTION OF THE DRAWINGS

FIG. 1 is a diagrammatic representation of a combined-cycle system with gas and steam turbines and generator on a single shaft.

BEST MODE FOR CARRYING OUT THE INVENTION

Referring now to the drawing, there is illustrated a gas turbine, generally designated 10, a steam turbine, generally designated 12 and a power generator, generally designated 14. The turbines 10 and 12 and the generator 14 are on a single shaft 16. A speed control or governor 18 for the gas turbine 10 is diagrammatically illustrated. As indicated previously, the speed control is of the constant settable droop type which employs an error signal between actual 28 and reference speeds 30 of the gas turbine which, according to the present invention, is in proportion to the power generated by the gas turbine for controlling the fuel flow to the gas turbine in a single shaft combined-cycle steam and gas turbine power generation system. To provide a signal representative of only the gas turbine power output for purposes of applying a constant settable droop governor control system, the speed control 18 is provided a signal corresponding only to the proportion of the gas turbine contribution to total generator output. To generate that signal, a first signal 22 or value representative of the total output of the generator 14 is applied to a comparator 20. A second value or signal representative of the power output of the steam turbine is also applied to the comparator 20. The second signal 24 o can be obtained as a function of the reheater pressure in a reheat steam turbine or in the turbine bowl pressure, downstream of the first-stage turbine nozzle, in a non-reheat steam turbine. The two signals 22 and 24 are compared with one another in the comparator 20 and a signal representing the steam turbine power output is subtracted from the signal representing the total generator output to provide a third signal 26 representative of only the power output of the gas turbine. This third signal is then applied to the speed governor 18, which in turn alters the fuel flow to the gas turbine as a function of the error signal between the actual and reference speeds and the power output solely of the gas turbine.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a combined-cycle power generating system having a gas turbine, a steam turbine, and a generator, on a single shaft, comprising the steps of:

obtaining a first value representative of the total power output of the generator;

obtaining a second value representative of the power output of the steam turbine;

correlating the first and second values to obtain a third value representative of the power contribution solely of the gas turbine to the total power output of the generator;

providing a speed governor for controlling fuel flow to the gas turbine as a function of an error signal between actual and reference speeds of the gas turbine; and causing a proportional response of the speed governor to the error signal between the actual and reference speeds of the gas turbine and the third value for controlling the flow of fuel to the gas turbine.

2. A method according to claim 1 wherein the steam turbine is a reheat steam turbine, and including the further step of obtaining the second value as a function of the reheater pressure of the reheat steam turbine.

3. A method according to claim 1 wherein the steam turbine includes a first-stage turbine nozzle, and including the further step of obtaining the second value as a function of the steam pressure downstream of the first-stage nozzle.

4. A method of operating a combined-cycle power generating system having a gas turbine and a steam turbine coupled to a generator comprising the steps of:

measuring the total power output of the generator and providing a first signal proportional thereto;

measuring the power output of the steam turbine and providing a second signal proportional thereto;

subtracting the second signal from the first signal to provide a third signal representative of the power contribution solely of the gas turbine to the total power output of the generator and independent of fuel or fuel injection conditions of the gas turbine; and controlling the flow of fuel to the gas turbine as a function of an error signal between actual and reference speeds for the gas turbine and said third signal.

5. A method according to claim 4 wherein the steam turbine is a reheat steam turbine, and including the further step of obtaining said second signal as a function of the reheater pressure of the reheat steam turbine.

6. A method according to claim 4 wherein the steam turbine includes a first stage turbine nozzle, and including the further step of obtaining said second signal as a function of the steam pressure downstream of the first stage nozzle.

7. A method of operating a combined-cycle power generating system in steady state operation wherein the power generating system includes a gas turbine, a steam turbine, and a generator, on a single shaft, comprising the steps of:

obtaining a first value representative of the total power output of the generator;

obtaining a second value representative of the power output of the steam turbine;

correlating the first and second values to obtain a third value representative of the power contribution solely of the gas turbine to the total power output of the generator and independent of fuel or fuel injection conditions of the gas turbine;

providing a constant settable droop governing system for controlling fuel flow to the gas turbine as a function of an error signal between actual and reference speeds of the gas turbine; and causing a proportional response of said governing system to the error signal between the actual and reference speeds of the gas turbine and the third value for controlling the flow of fuel to the gas turbine.

8. A method according to claim 7 wherein the steam turbine is a reheat steam turbine, and including the further step of obtaining the second value as a function of the reheater pressure of the reheat steam turbine.

9. A method according to claim 7 wherein the steam turbine includes a first-stage turbine nozzle, and including the further step of obtaining the second value as a function of the steam pressure downstream of the first-stage nozzle.

* * * * *